United States Patent [19]
Arabinick et al.

[11] Patent Number: 6,077,914
[45] Date of Patent: Jun. 20, 2000

[54] PROCESS FOR MODIFYING THE RHEOLOGY OF POLYOLEFINS

[75] Inventors: Nancy D. Arabinick, Bensalem; John L. Burba, III, Newtown; William O. Dalton, Chadds Ford, all of Pa.

[73] Assignee: FMC Corporation, Philadelphia, Pa.

[21] Appl. No.: 09/025,823

[22] Filed: Feb. 19, 1998

Related U.S. Application Data

[60] Provisional application No. 60/038,710, Feb. 20, 1997.

[51] Int. Cl.⁷ ........................................................ C08F 8/50
[52] U.S. Cl. ........................................ 525/344; 525/333.9
[58] Field of Search ................................................ 525/344

[56] References Cited

U.S. PATENT DOCUMENTS

| | | | |
|---|---|---|---|
| 2,320,851 | 6/1943 | Cramer | 525/333.9 |
| 3,143,584 | 8/1964 | Roberts et al. | 525/333.9 |
| 3,442,803 | 5/1969 | Hoover et al. | 252/8.55 |
| 3,464,952 | 9/1969 | Larsen | 525/333.9 |
| 3,887,534 | 6/1975 | Baba et al. | 260/93.7 |
| 4,537,922 | 8/1985 | Chang et al. | 525/333.9 |
| 5,530,073 | 6/1996 | Schoenberg | 525/333.9 |

*Primary Examiner*—Bernard Lipman
*Attorney, Agent, or Firm*—Patrick C. Baker; Bruce M. Monroe

[57] ABSTRACT

The molecular weight of a polyolefin such as polypropylene is reduced, as evidenced by lowered viscosity and increased melt flow rate, by treatment with an inorganic peroxygen selected from metal persulfates, ammonium persulfates, and any mixtures thereof. The treatment avoids or minimizes the color or odor attendant treatment with organic peroxygens and the toxic products of organic persulfate decomposition, and avoids the special handling required with organic peroxides.

14 Claims, No Drawings

PROCESS FOR MODIFYING THE RHEOLOGY OF POLYOLEFINS

This application claims benefit of provisional application No. 60/038,710, filed Feb. 20, 1997.

TECHNICAL FIELD

This invention relates to processes for modifying the rheology of polyolefins such as polypropylene.

Typically, polyolefins such as produced with Ziegler-Natta catalysts have high molecular weights and broad molecular weight distributions. This appears as high melt viscosity (low melt flow index—also known as "melt flow rate") and high elasticity, limits efficient processing of the polyolefin in many product applications, such as molding, thin films and thin fibers, and can impair product quality. The industry therefore seeks methods for reducing polymer molecular weight and narrowing the molecular weight distribution as evidenced by changes in rheology (viscosity reduction) of the polyolefins in liquid phase. The narrow molecular weight distribution and increase in melt flow rate are directly responsible for improved flow properties of polypropylene. This objective is often described as "modifying" or "controlling" the rheology of the polyolefins—changing the rheology to make the polyolefin more acceptable in product applications. The viscosity reduction is also described as "viscbreaking".

BACKGROUND

A known process for viscbreaking polyolefins such as polypropylene is extrusion at about 180–260° C. in the presence of an organic peroxygen compound ("peroxygen"). A typical organic peroxygen used commercially for this purpose is 2,5-dimethyl-2,5-di(t-butylperoxy) hexane, sold by Aldrich Chemical Co. as "Lupersol 101". This peroxygen is a liquid boiling at 115° C. and having a minimum active oxygen content of 9.92%. Dispersion of this organic peroxygen in the polypropylene or other polyolefin is usually assisted by dilution of the peroxygen in mineral oil, coating of the polyolefin particles, and/or metered injection directly into the extruder. Although Lupersol 101 peroxygen is effective in lowering the viscosity of polyolefins and producing a relatively narrow molecular weight distribution, it leaves an odor in polyolefin from decomposition products such as tetrabutyl alcohol, thus requiring vacuum venting and stabilizers at predetermined levels to reduce the degradation of the polyolefin by oxgen. Lupersol 101 also decreases the polydispersity index of polyolefin, e.g., in the case of polypropylene to about 3.5–6.0. Polyolefin yellowing may also be induced by the peroxygen, requiring a lower extrusion temperature, a nitrogen blanket and/or stabilizers to eliminate or minimize the coloration. The venting, stabilization and color control procedures, separately or when combined, add significantly to the complexity and cost of the viscbreaking process.

Organic peroxides are known to leave toxic decomposition products in polyolefins such as polypropylene during the viscbreaking process. Moreover, due to their organic nature, such peroxides require special handling precautions. Accordingly, safe handling is a significant concern with organic peroxides.

A free radical mechanism is believed to account for polyolefin degradation by application of peroxygens. Initially, the peroxygen decomposes to produce free radicals. These free radicals then abstract hydrogen from the tertiary carbon of the polyolefin backbone to form radicals on the polymer. This results in chain cleavage of the formed free radicals. The process can be terminated by recombination of the polymer free radicals. Oxygen, processing stabilizers and antioxidants are known to interfere with the polymer degradation process due to competing radical reactions. It is thus important to control the parameters of the reaction, including purity of reactants, the environment of the degradation process, and process conditions.

DISCLOSURE OF THE INVENTION

It has now been discovered that certain inorganic peroxygens are effective as rheology modifiers for polyolefins without introducing intolerable levels of odor and/or color and requiring special handling precautions. The polyolefms include polypropylene, polyethylene, propylene-ethylene copolymers, and any other polyolefins prepared by Ziegler-Natta catalysis. The inorganic peroxygens of this invention are metal persulfates, ammonium persulfate (also known as ammonium peroxydisulfate), any mixtures of metal persulfates, or any mixtures of one or more metal persulfates with ammonium persulfate. The metal persulfates are the alkali metal persulfates such as sodium peroxymonosulfate, potassium peroxymonosulfate, sodium peroxydisulfate and potassium peroxydisulfate.

Of the described persulfates, sodium peroxydisulfate is presently preferred because it has good water solubility and the highest decomposition temperature as a solid (275° C.). The higher decomposition temperature persulfates are preferred when the polyolefin is to be viscbreaked at higher temperatures. Water solubility of the persulfate permits dissolving the persulfate in an aqueous medium and then adding the persulfate solution to the polyolefin, preferably with the assistance of a wetting agent (also characterizable as a surfactant or emulsifier) because polyolefins generally are highly viscous hydrophobic liquids.

To ensure neutralization of bisulfate byproducts or impurities which may be present in the persulfate, a neutralizing or buffering agent may be added to or with the inorganic persulfate. A typical buffering agent is sodium carbonate.

The concentration of inorganic peroxygen effective to viscbreak the polyolefin is in the range of about 0.001 to 2 wt % on weight of polyolefin. A preferred range is 0.05 to 1.0 wt %, more preferably 0.1 to 0.3 wt %. The peroxygen concentration may be adjusted as necessary to improve distribution in the polyolefin while providing effective viscbreaking. The amount of solvent, whether water or aprotic, used to disperse the peroxygen in the polyolefin, must be balanced against the cost of evaporating and venting the solvent during the extrusion. For example, every 1% of water added to the extruder increases the energy costs for degrading a polyolefin about 5%.

Any mechanism, equipment or system effective for shearing polyolefins, i.e., capable of reducing molecular weight, may be used in accordance with the invention. Suitable means include extruders, radio frequency generators such as microwave devices, and mechanical shearing devices such as blenders and the like. Extrusion is the preferred means because the shearing can be combined with production of commercially useful forms, extrusion being the most commonly practiced forming method for polyolefins.

When employing extrusion, the inorganic peroxygen may be injected into the polymer melt during extrusion. This downstream injection permits good dispersion of peroxygen in polyolefin and contact of the free radicals generated from the peroxygen with the polyolefin. It is belived that the downstream injection provides more control over the process, for example by modifying molecular weight distribution of the polymer product.

Another method of contacting polyolefin with the inorganic peroxygen as part of an extrusion process is "soaking". In this method, the peroxygen is mixed with polyolefin, usually at room temperature, and the mixture is then injected into the extruder. In the case of inorganic peroxygens, the peroxygen is mixed with solvent and wetting agent, for example in a Waring Blendor-type device, to form a solution. This solution is then sprayed, via a fine spray nozzle, onto polyolefin. The thus treated polyolefin is then aged for several hours at room temperature prior to extrusion.

A third method of admixing the inorganic peroxygen and the polyolefin is to blend a solid peroxygen of the invention with the polyolefin along with a wetting agent or extrusion lubricant. The solid peroxygen, wetting agent and polyolefin are fed into the extruder and become molten. When the polymer is molten, either water or an aqueous buffer solution is injected downstream to rapidly solubilize the solid peroxygen and to decompose it into free radicals.

Extrusion can be performed in the presence or absence of air or nitrogen. However, a nitrogen blanket is preferred if it is desired to evaluate the viscbreaking effect of peroxygens alone, since oxygen is known to provide a small viscbreaking effect. Commercial extrusion is effected in ambient air. An extrusion temperature in the range of about 180° C. to 280° C. is suitable, preferably about 200° C. to 260° C.

As indicated, it may be desirable to add a wetting agent to improve miscibility of the inorganic peroxygen in the polyolefin. When using downstream injection during extrusion, an aqueous solution of the peroxygen is prepared and a wetting agent added, typically in an amount of about 0.1–5 wt % on total solution, preferably about 1–3 wt %. The peroxygen solution containing the wetting agent is then injected into the polyolefin melt. When the "soaking" method is used, in some cases a smaller amount of wetting agent may be added, of the order of about half or less, that used in the injection method. For example, about 0.5–1 wt % of wetting agent may be effective. However, it will be understood that the amount of wetting agent will depend on the type of wetting agent and polyolefin, and conditions (temperature, extrusion time and rate, and the like) of the extrusion or other polyolefin degradation process, and may be varied accordingly.

Suitable wetting agents include ionic (anionic, cationic) and nonionic types. A typical anionic wetting agent is an isopropanol amine sulfonate of dodecylbenzene sulfonic acid sold by Witco Chemical Company as "Witconate P-1059". Another is polyethylene glycol tert-octylphenyl ether sold by Union Carbide Corporation as "Triton X-100". Other wetting agents include linear primary alcohol ethoxylate such as those sold by Shell Oil Co. as "Neodol".

Extrusion lubricants (release agents) also help to improve the viscbreaking performance of inorganic peroxygens. Release agents include fatty acids, fatty acid metal salts, fatty amides, fatty amines, waxes, silicones, silicates, and clays. Specific examples include stearic acid and metal salts thereof (alkali or alkaline earth) such as sodium stearate, calcium stearate and zinc stearate.

The following examples will serve to further illustrate the invention but are not intended as limitations on the scope thereof. In the examples and throughout this specification and claims, all parts and percentages are by weight and "sodium persulfate" means sodium peroxydisulfate unless the context otherwise indicates.

EXAMPLES

Example I—Brabender Viscbreaking

Brabender torque-rheometer mixer experiments were performed to determine temperatures, emulsifying agent, peroxygen concentration, and peroxygen addition method to achieve a viscbreaking performance equal to or better than Lupersol 101 organic peroxygen when using a twin-screw extruder. In an extruder the material is transferred very quickly to hot zones while in the Brabender mixer the transfer of heat to the polymer is slower. Brabender mixer studies cannot predict the exact conditions required to ensure the system will work in an extruder but if the system yields good viscbreaking performance in a Brabender mixer, there is a strong likelihood for success in an extruder.

Test Procedures

A. Materials and Reagents

Irganox 1010

Tetrakis [methylene(3,5-di-tert-butyl-4-hydroxyhydrocinnamate)methane]—antioxidant/stabilizer from Ciba-Geigy Corp.

Irgafos 168

Tris(2,4-di-tertbutylphenyl)phosphite—a process additive from Ciba-Geigy Corp.

Stabilized Polypropylene

Montell 6501 polypropylene (600) stabilized with 0.1% Irganox 1010 (0.6 g) and 0.1% Irgafos 168 (0.6 g).

Persulfate Buffer Solution (0.3%)

Prepared by admixture of 11 mL deionized water, 3.4 g sodium persulfate and 1.15 g sodium carbonate.

Persulfate Buffer Solution (0.15%)

Prepared by admixing 11 mL deionized water, 1.7 g sodium persulfate and 1.15 g sodium carbonate.

Persulfate Buffer Solution (0.08%)

Prepared by admixing 11 mL deionized water, 0.85 g sodium persulfate and 1.15 g sodium carbonate.

Buffer Solution

Prepared by admixing 11 mL deionized water and 1.15 g sodium carbonate.

B. Procedure

Using a Brabender torque-rheometer mixer, the temperature of the unit was set at either 180 or 220 ° C. with a mixing speed of 40 rpm. The feed hopper and mixing section of the Brabender mixer were kept under a nitrogen atmosphere throughout the experiment. Polypropylene, 40 g, stabilized with 0.1% Irgafos 168 and 0.1% Irganox 1010, was melted in the mixer for three minutes. If any injections were required such as Lupersol 101 or sodium persulfate solutions, the injection was added after the polymer had melted in the mixer for three minutes. The resulting mixture was mixed for an additional eight minutes whereupon the experiment was stopped and the treated polypropylene was collected. All experiments were run in the Brabender mixer for a total of eleven minutes. After reaching room temperature, the treated polymer was ground in a Wiley Mill. The ground polymer was added to a Tinius-Olsen Extrusion Plastometer for determining the melt flow rate (also known as "Melt Flow Index") following ASTM 1238.

The same procedure was used for "soaked" materials except the additives were blended with the polypropylene prior to being placed in the Brabender.

The test results are set forth in Tables I(A) and I(B) below. In the Tables, "SP" means sodium persulfate, "Soaked" means SP solution sprayed onto the polypropylens, and "Inject" means downstream injection with either deionized water or an alkaline buffer. As evident from the test results, the viscbreaking performance of several persulfate-based systems is equal or better than the performance of Lupersol 101 peroxygen at 180 ° C. and 220 ° C.

TABLE I(A)

Brabender Viscbreaking at 180° C. and 40 rpm

| Expt | System | Melt Flow Rate | Calc. MW | % Reduction |
|---|---|---|---|---|
| 1 | Stabilized Polypropylene | 4.7 | 428,800 | — |
| 2 | Lupersol 101 (0.04% on polypropylene) | 11.2 | 338,000 | 21.2% |
| 3 | 1% Stearic Acid and Stabilized Stabilized Polypropylene | 6.2 | 397,500 | 7.3% |
| 4 | 1% Stearic Acid, 0.4 mL SP Buffer (0.3% SP) Soaked | 14.1 | 317,400 | 26.0% |
| 5 | 1% Stearic Acid, 0.12 g SP solid (0.3% SP), 1.2 mLs H2O- Inject | 11.5 | 335,600 | 21.7% |
| 6 | 0.5% Stearic Acid, 0.12 g SP solid (0.3% SP), 1.2 mLs H2O- Inject | 10.0 | 348,700 | 18.7% |
| 7 | 1% Stearic Acid, 0.4 mLs SP Buffer (0.15% SP) Soaked | 14.4 | 315,600 | 26.4% |
| 8 | 1% Stearic Acid, 0.4 mLs SP Buffer (0.08% SP) Soaked | 11.0 | 339,700 | 20.8% |
| 9 | 0.5% Stearic Acid, 0.12 g SP solid (0.3% SP), 1.2 mLs Buffer - Inject | 13.6 | 320,500 | 25.3% |

TABLE I(B)

Brabender Viscbreaking at 220° C. and 40 rpm

| Expt | System | Melt Flow Rate | Calc. MW | % Reduction |
|---|---|---|---|---|
| 1 | Stabilized Polypropylene | 4.8 | 426,400 | — |
| 2 | Lupersol 101 (0.04% to polypropylene) | 17.8 | 297,700 | 30.2% |
| 3 | 0.5% Stearic Acid, 0.4 mL SP Buffer (0.15% SP) Soaked | 23.2 | 276,900 | 35.0% |
| 4 | 1.0% Stearic Acid, 0.4 mL SP Buffer (0.15% SP) Soaked | 28.1 | 262,700 | 38.4% |
| 5 | 1.0% Stearic Acid, 0.15% SP Solid, 1.2 mL Buffer - Inject | 24.0 | 274,300 | 35.6% |
| 6 | 1.0% Stearic Acid, 0.4 mL SP Buffer (0.08% SP) Soaked | 28.9 | 260,700 | 38.9% |
| 7 | 0.5% Stearic Acid, 0.4 mL SP Buffer (0.08% SP) Soaked | 26.9 | 265,900 | 37.6% |

Example II—Extrusion Viscbreaking-Liquid Injection ("Inj.")

Two procedures were used for testing the peroxygens as viscbreakers. The first was liquid injection into molten polypropylene in an extruder. The second comprised premixing the peroxygens and polypropylene prior to extrusion. The test procedures as well as preparation of the peroxygen test solutions are described below. The melt flow indices indicate whether the rheology of the polypropylene has been modified. The higher the melt flow index (melt flow rate) the lower the average molecular weight of the treated polypropylene.

A. Materials and Reagents

The test solutions for the extrusion experiments were the following:

Alkaline Sodium Persulfate (also referred to as Sodium Persulfate/Buffer)

6.831 g sodium persulfate and 2.270 g sodium carbonate were dissolved in 22 mL deionized water. To this solution was added 0.11 g Triton X-100 wetting agent. The pH of the solution was 11.

Aqueous Sodium Persulfate (Sodium Persulfate/$H_2O$ 6.831 g sodium persulfate was dissolved in 22 mL deionized water. To this solution was added 0.11 g Triton X-100. Lupersol 101—2.5-dimethyl 1–2.5-di(t-butylperoxy) hexane A liquid, used "as is" (90% by weight) from Aldrich Chemical Co.

B. Procedure

1. Injection during Extrusion ("Inj.")

Using a Werner & Pfleiderer Twin Screw extruder ZSK-30, Montell polypropylene 6501 was added to the extruder at 180° C. and exited the extruder at 200° C. Pure polypropylene was extruded for 15 minutes prior to injecting the test peroxygen solution into the molten polypropylene present in the extruder. Immediately after cooling the treated polypropylene in cool water, the pure extruded polypropylene was pelletized and collected. This pelletized sample was dried in a vacuum oven at 70° C. for 18 hours to remove surface moisture. The melt flow index for the dried sample was determined using ASTM standard 1238 in a Tinius Olsen Extrusion Plastometer Model UE-7-78. The melt flow index analysis was performed in triplicate and the average of the three indices was reported.

2. Premixing with Polypropylene before Extrusion ("Premix)

To 189 g of Montell polypropylene 6501 (M. A. Hanna) was added 1.8 mL of a test peroxygen solution. This composition was mixed in a Waring Blendor at high speed for one minute. A total of 2270 g polypropylene was treated by this method. Using a Werner & Pfleiderer Twin Screw extruder ZSK-30, the treated Polypropylene was added to the extruder at 180° C. and exited the extruder at 200° C. Immediately after cooling the treated polypropylene in cool water, the pure extruded polypropylene was pelletized and collected. This pelletized sample was dried in a vacuum oven at 70° C. for 18 hours to remove surface moisture. The melt flow index for the dried sample was determined using ASTM standard 1238 in a Tinius Olsen Extrusion Plastometer Model LTE-7-78. The melt flow index analysis was performed in triplicate and the average of the three indices was reported.

Test Results

1. The test results are set forth in Table II below in comparison with untreated polypropylene (control) and polypropylene treated with Lupersol 101 organic peroxygen. The concentration of test peroxygen in the polypropylene resin is expressed as parts by weight of peroxygen per hundred parts by weight of resin ("phr"—per hundred resin). The data indicates that best reduction (24%) in average molecular weight by treatment with sodium persulfate was achieved by injection of buffered composition.

TABLE II

Results of Extrusion Studies

| Peroxygen | Procedure | Conc. phr | Melt Flow Rate (Avg.) | Calculated Wt. Avg. Mol Wt. | % Reduction (Avg.) |
|---|---|---|---|---|---|
| Lupersol 101 | Inj | 0.04 | 80.9 | 197,000 | 54% |
| Sodium Persulfate/Buffer | Inj | 0.3 | 12.9 | 325,000 | 24% |
| Sodium Persulfate/Buffer | Premix | 0.3 | 10.42 | 345,000 | 19% |
| Sodium Persulfate/$H_2O$ | Inj | 0.3 | 10.4 | 345,000 | 19% |
| Pure polypropylene | Inj/Premix | — | 4.82 | 426,000 | — |

2. Three samples of the aforementioned extruded polymers—untreated polypropylene, Lupersol 101 viscbroke material and material viscbroken by injecting alkaline sodium persulfate solutions were analyzed by gel permeation chromatography (GPC). GPC analyses were used to determine the molecular weight and molecular weight distribution of each sample.

TABLE III

GPC Results

| Sample | Mn | Mw | Mz | Poly-dispersity |
|---|---|---|---|---|
| Untreated Polypropylene | 79,512 | 506,124 | 1,391,005 | 6.37 |
| Lupersol 101-treated polypropylene | 49,419 | 228,275 | 516,493 | 4.62 |
| Injected Sodium Persulfate Buffer - Polymer | 57,742 | 413,470 | 1,107,321 | 7.16 |

The GPC results confirmed the trend of the average molecular weight results calculated from melt flow rate analyses performed after extrusion. Most polypropylene resins have a polydispersity index of 3.5–6.0. (Polydispersity is the ratio of the weight average molecular weight (Mw) over the number average molecular weight (Mn).) The higher the polydispersity index the broader the molecular weight distribution. Organic peroxides are well-mixed with the polymer prior to degradation and typically yield low polydispersity indices, including some cases approaching the theoretical minimum polydispersity index of 2.0. The polymer viscbroke with persulfate had a broader molecular weight distribution than the untreated polymer based on the polydispersity value of 7.16. For injection molding applications (which account for approximately half of the viscbroken polypropylene market), a broad molecular weight distribution gives greater toughness and rigidity. These characteristics of viscbroken polypropylene are desired in many products.

The persulfate-treated polymer also had only a 20% loss in z-average molecular weight (Mz) and 28% loss in Mn, indicating the material would be good for injection molding applications. It is difficult for organic peroxides to viscbreak polypropylene to yield polymer with a high Mz. The Lupersol 101-treated material had a narrow molecular weight distribution with a 63% loss in Mz and a 38% loss in Mn.

We claim:

1. In a process for modifying the rheology of polyolefins, the improvement which comprises shearing a polyolefin in contact with at least one peroxygen compound selected from (a) metal persulfates, (b) ammonium persulfate, and (c) mixtures of (a) and (b).

2. The process of claim 1 wherein persulfates (a) are alkali metal persulfates selected from sodium persulfate (mono or di) and potassium persulfate (mono or di).

3. The process of claim 1 wherein the shearing process is extrusion and the peroxygen compound is injected into the polyolefin during the extrusion.

4. The process of claim 3 wherein the peroxygen compound comprises an aqueous dispersion of (a), (b) or (c), and the dispersion optionally contains a wetting agent.

5. The process of claim 3 wherein water is injected separately or with the peroxygen compound in an amount effective to disperse the peroxygen compound in the polyolefin phase.

6. The process of claim 3 wherein the peroxygen compound is added as a solid to the polyolefin and an aqueous solution with or without buffer is injected, and the aqueous solution contains a wetting agent and/or the polymer contains an extrusion lubricant.

7. The process of claim 6 where the lubricant is stearic acid or salt thereof.

8. The process of claim 6 wherein a wetting agent is injected with the water or is injected separately.

9. The process of claim 1 wherein the shearing process is extrusion and the peroxygen compound, or an aqueous dispersion thereof, is admixed with the polyolefin prior to extrusion.

10. The process of claim 9 wherein the dispersion contains a wetting agent.

11. The process of any one of claims 3–10 wherein the internal temperature during extrusion is about 180–260° C.

12. The process of any one of claims 1–10 wherein the amount of peroxygen compound is about 0.001–2 wt % on weight of polyolefin.

13. The process of any one of claims 1–10 wherein the polyolefin is polypropylene.

14. The process of any one of claims 3–10 wherein the polyolefin is polypropylene, the peroxygen compound is sodium peroxydisulfate, ammonium persulfate or an aqueous dispersion of either persulfate, and the aqueous dispersion optionally contains a wetting agent.

* * * * *